(No Model.)  8 Sheets—Sheet 1.

E. A. DELANO.
BARREL HOOPING MACHINE.

No. 528,765.  Patented Nov. 6, 1894.

(No Model.) 8 Sheets—Sheet 2.
E. A. DELANO.
BARREL HOOPING MACHINE.

No. 528,765. Patented Nov. 6, 1894.

Witnesses:
Chas. E. Gaylord
Clifford N. White

Inventor:
E. A. Delano
By G. B. Coupland & Co.
Attys.

(No Model.) 8 Sheets—Sheet 3.
E. A. DELANO.
BARREL HOOPING MACHINE.

No. 528,765. Patented Nov. 6, 1894.

Witnesses:
Chas. E. Gaylord
Clifford N. White

Inventor:
E. A. Delano.
By L. B. Coupland & Co
Attys

THE NORRIS PETERS CO., PHOTO-LITHO., WASHINGTON, D. C.

(No Model.) 8 Sheets—Sheet 4.
E. A. DELANO.
BARREL HOOPING MACHINE.

No. 528,765. Patented Nov. 6, 1894.

Witnesses:

Inventor,
E. A. Delano
By L. B. Coupland & Co
Att'ys (No Model.) 8 Sheets—Sheet 5.

E. A. DELANO.
BARREL HOOPING MACHINE.

No. 528,765. Patented Nov. 6, 1894.

Fig. 9.

Witnesses:
Chas. E. Gaylord.
Clifford N. White.

Inventor:
E. A. Delano.
By L. B. Coupland & Co
Attys.

THE NORRIS PETERS CO., PHOTO-LITHO., WASHINGTON, D. C.

(No Model.) 8 Sheets—Sheet 6.

E. A. DELANO.
BARREL HOOPING MACHINE.

No. 528,765. Patented Nov. 6, 1894.

Witnesses:
Chas E Gaylord
Clifford N White

Inventor:
E. A. Delano.
By L. B. Coupland & Co
Att'ys

(No Model.) 8 Sheets—Sheet 7.

E. A. DELANO.
BARREL HOOPING MACHINE.

No. 528,765. Patented Nov. 6, 1894.

Witnesses:
Chas. E. Gaylord,
Clifford N. White.

Inventor,
E. A. Delano.
By L. B. Coupland & Co.
Attys.

(No Model.) 8 Sheets—Sheet 8.
E. A. DELANO.
BARREL HOOPING MACHINE.

No. 528,765. Patented Nov. 6, 1894.

Fig. 18.

Witnesses:
Chas. E. Stafford
Clifford N. White

Inventor:
E. A. Delano.
By L. B. Coupland & Co
Att'ys

UNITED STATES PATENT OFFICE.

EBEN A. DELANO, OF CHICAGO, ILLINOIS, ASSIGNOR TO JOHN A. SEAMAN, OF SAME PLACE.

BARREL-HOOPING MACHINE.

SPECIFICATION forming part of Letters Patent No. 528,765, dated November 6, 1894.

Application filed February 1, 1893. Serial No. 460,552. (No model.)

*To all whom it may concern:*

Be it known that I, EBEN A. DELANO, a citizen of the United States, residing at Chicago, in the county of Cook and State of Illinois, have invented certain new and useful Improvements in a Barrel-Hooping Machine, of which the following is a full, clear, and exact description, that will enable others to make and use the same, reference being had to the accompanying drawings, forming a part of this specification.

This invention pertains to improvements in machines for hooping barrels, kegs, casks and the like, and relates more especially to a machine for setting or driving thin metal hoops in the manufacture of "tight" work.

Figure 9:
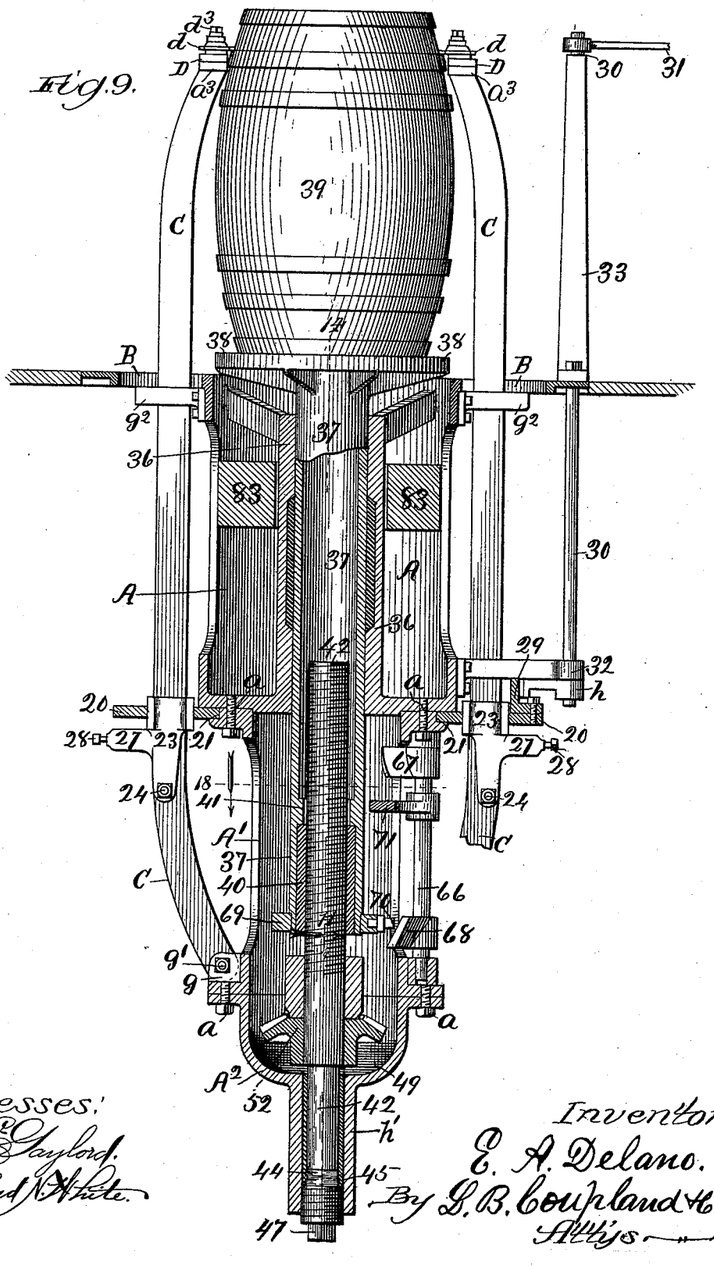
Fig. 9, part elevation and part vertical section, the section being on line 9, Figs. 7 and 8.
Figures 10, 12:
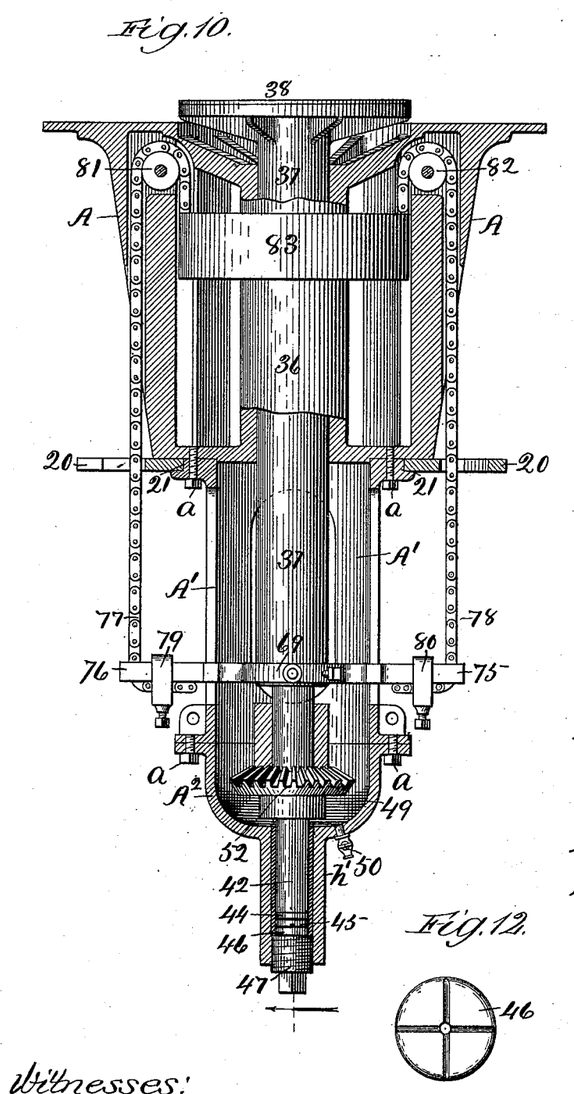
Fig. 10, part elevation and part vertical section, the section being on line 10, Fig. 7.
Fig. 12, a plan of a bearing-disk or button for lower end of screw driving-shaft.

The supporting-frame is of a hollow cylindrical form, and consists of the upper end section or part A, the middle section A', and the lower end section A². The meeting edges of these sections are rigidly bolted together, as at $a$, Figs. 1, 9 and 10. The upper end of the frame is provided with a flanged head-plate B, which will, ordinarily, be embedded flush with the surface of the floor and resting on the joist, thus supporting the machine in the suspended vertical position shown; the main parts being below the floor on which the operator stands.

Figure 3:
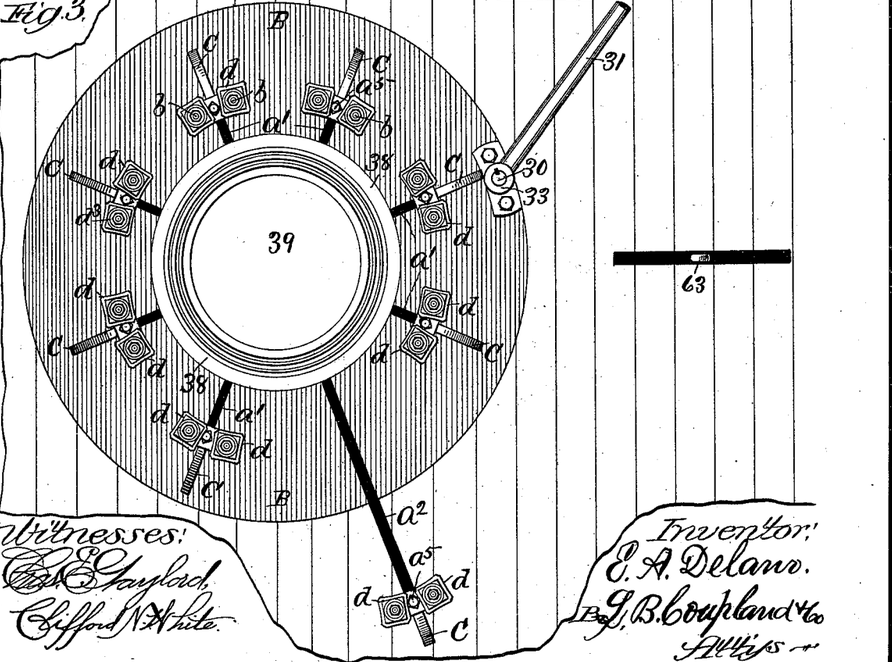
Fig. 3, a plan, showing the pull-bars in their outer or disengaged position.
Figure 4:
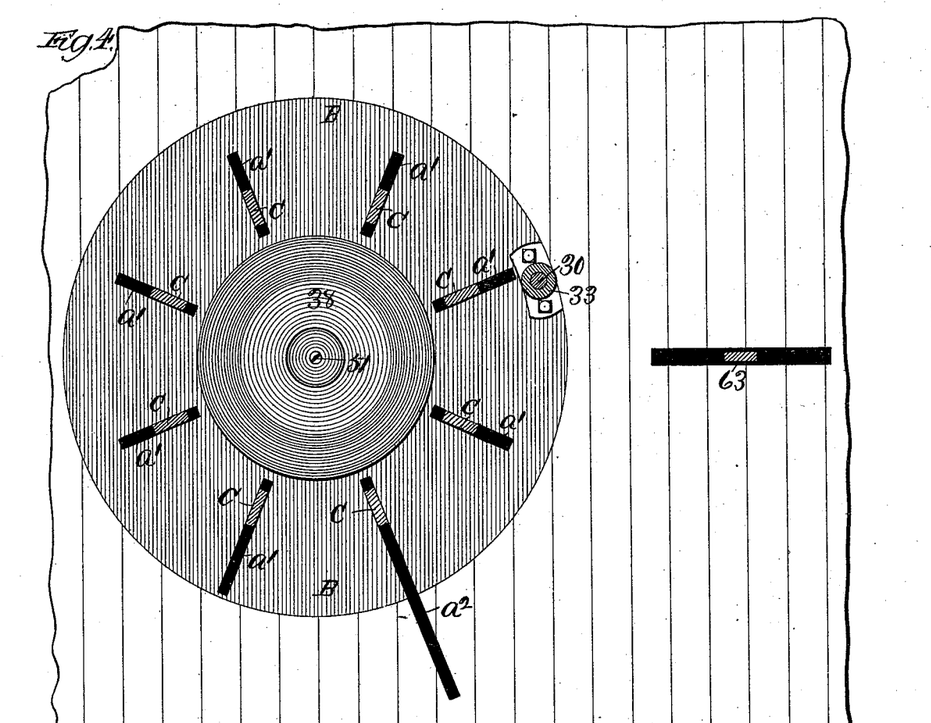
Fig. 4, a horizontal section on line 4, Fig. 1, looking in the direction indicated by the arrow.

The flanged-head B is provided, radially, at intervals, with a number of elongated apertures or slots $a'$, starting from the inner, but stopping short of the outer, edge of the flanged-head. This feature provides for the lateral in-and-out movement of the upper ends of the series of pull-bars C, arranged in a circle and projecting through the slotted apertures $a'$. The longer slotted aperture $a^2$ (Figs. 2, 3 and 4), extends beyond the edge of the flanged-head so that one of the series of pull-bars may be thrown out farther than the companion bars and thereby provide room for putting in and taking out the work at that particular point.

The term "pull-bars" is used as a distinguishing feature from that of "driver-arms" common in this class of inventions; as in this machine the pull-bars do not have an endwise movement, but hold the hoops stationary; the barrel being forced into the same.

Figure 5:
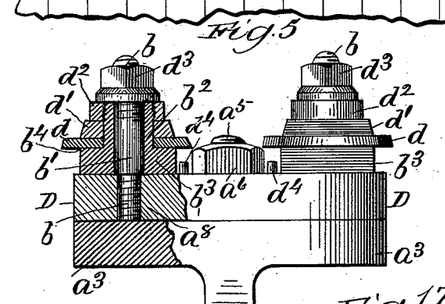
Fig. 5, a broken-away sectional detail of the upper end of one of the pull-bars and pull-heads.
Figure 6:
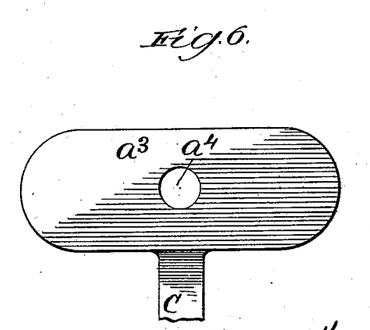
Fig. 6, a plan of the upper end of one of the pull-bars.
Figure 17:
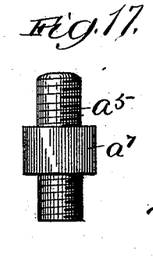
Fig. 17, (Sheet 3), an elevation of one of the pivot-bolts attaching the pull-heads to the upper ends of the pull-bars.
Figure 18:
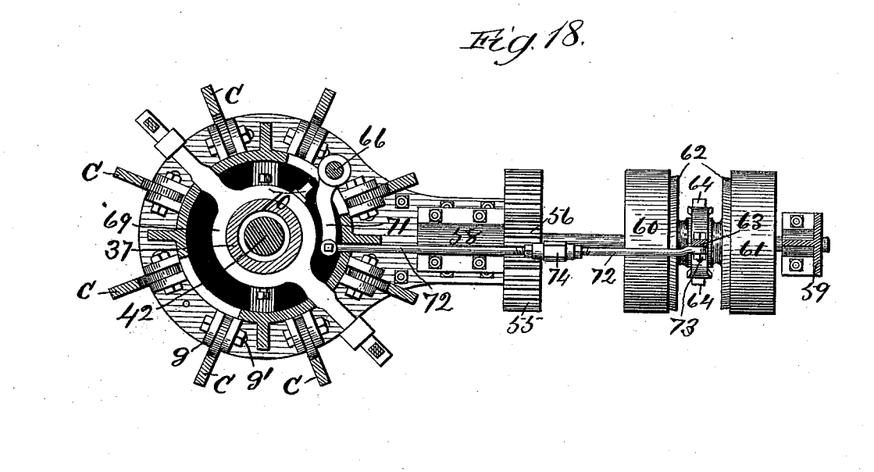
Fig. 18, a horizontal section on line 18, Fig. 9.

The upper free ends of the pull-bars curve inwardly somewhat and terminate in the elongated flange $a^3$ (Figs. 5 and 6) provided centrally with an aperture $a^4$, to receive the lower end of the pivotal stud-bolt $a^5$ (Fig. 17, Sheet 3), pivotally attaching the pull-heads to the free ends of the pull-bars.

The pull-heads consist of a number of parts, which will now be described.

The swivel-plates D are of an elongated form corresponding to that of the flanged ends of the pull-bars, and are seated thereon; being pivotally attached thereto by the stud-bolt $a^5$ and a threaded nut $a^6$. The stud-bolts $a^5$ are provided, centrally, with the enlarged collar part $a^7$, forming a smooth bearing-surface for the swiveling movement of the plate or plates D. The stud or pivot-bolts $a^5$ are inserted through the plates D and screwed into the upper or flanged ends of the pull-bars until the lower shoulder of the collar part $a^7$ comes to a bearing; the upper shoulder forming a stop for the nuts $a^6$, so that the swivel-plates cannot be clamped against a free alternate movement of their respective ends in the direction of, or away from, the barrel.

The swivel-plates D are provided in each end with a perforation $a^8$ (Fig. 5), to receive the lower ends of the pivot stud-bolts $b\,b$ having the enlarged collar part $b'$. A sleeve $b^2$ is mounted on each of the stud-bolts $b$ and swivels on the collar part thereof. These sleeves are provided with a square base $b^3$ of a greater diameter than the sleeve-part proper and seats loosely on the ends of the plates D. This enlarged base provides the annular shoulder $b^4$ forming a seat for the hoop-plates $d$, which are rigidly locked on the swiveling-sleeve by a washer $d'$ and a nut $d^2$ engaging with the upper exteriorly threaded end of said sleeve or sleeves. The threaded nut $d^3$ engages with the upper ends of the studs and comes to a bearing on the upper end of the collar part $b'$, thus preventing the sleeves from having a vertical movement but allowing a free swiveling action. The stop-pins $d^4$, projecting from the plate or plates D, limits the swiveling movement of the sleeves, as the corners of the square base come in contact therewith. This is to prevent the sleeves from turning too far on their pivots in either direction. If the movement of the sleeves was not confined to a fixed limit they would turn too far and often bring the corners of the hoop-plates $d$ in contact with the work instead of the edges.

The hoop-plates project somewhat and are the only parts having actual contact with the barrel and hoop, and are approximately square; the contacting edges being slightly concave to correspond to the curved or convex surface of the work. The hoop-plates, having four working edges, greatly lengthens their service, as, when one edge is worn the plates may be adjusted to bring another working-side into position and so on until all the edges of the plates have become worn.

Figure 2:
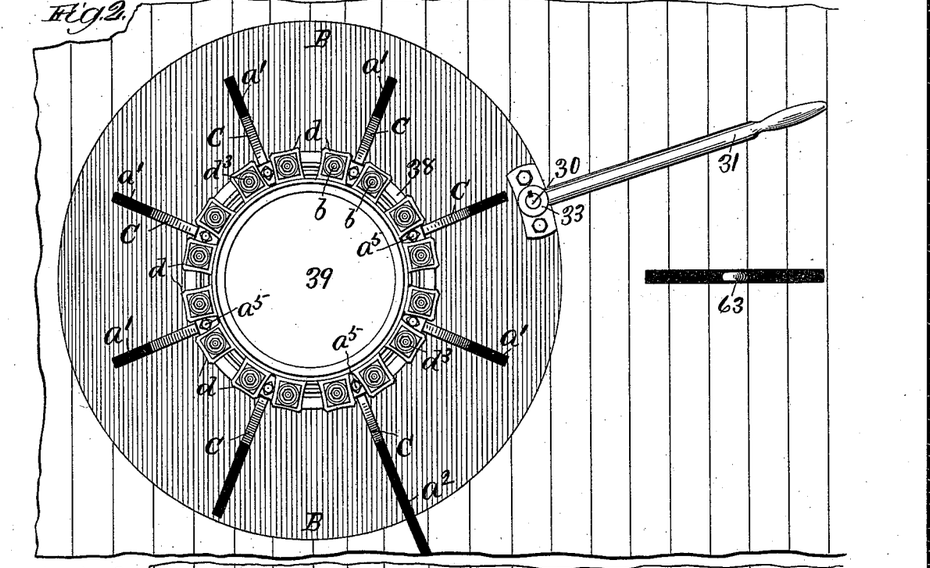
Fig. 2, a plan, showing the pull-bars in their inner or engaged position.

In operation, the under side of the hoop-plates $d$ come in contact with the upper edge of the hoop and remain stationary in that position until the hoop is in place. In setting the hoops, and especially light or thin ones, it is a positive requirement that the working-edges of the hoop-plates have a close, uniform contact with the surface of the barrel in order to insure a continuous and uniform bearing on the hoops; otherwise the edges of the hoop will be turned or caused to buckle and thereby destroyed; thus not only involving the loss of material but requiring the work to be done over again. The conditions and requirements of a machine for this class of work are, therefore, such that the dimensions of the contacting hoop-plates must be confined within a small limit, and as great a number used as can be mounted in the circle, and to have an independent swiveling adjustment with reference to each other. In this construction and arrangement each pull-bar is provided substantially with two independent swiveling hoop-plates mounted on a swiveling seat-plate common to each set, so that, no matter how uneven or irregular, or how much the surface of the barrel varies from a true circle, the parts will automatically conform thereto at the moment of contact and insure a uniform and a continuous bearing in an almost unbroken circle, as shown in Fig. 2.

The lower ends of the pull-bars curve inwardly and are pivotally connected to lugs $g$, formed on the exterior surface of the lower part of the frame, by pivot-pins $g'$ (Figs. 1 and 9) which provides for the free lateral or in-and-out movement of the upper ends of the bars in practical working. The brackets $g^2$, on the frame, serve to stiffen and prevent any tendency the bars may have to spring aside by reason of the friction contact and movement of the shifting mechanism. The upper ends of the pull-bars extend some way above the top of the frame, bringing the pull-heads into about the proper position to engage with the work.

Throughout the remainder of this specification numerals will be used as the reference characters instead of letters.

Figure 7:
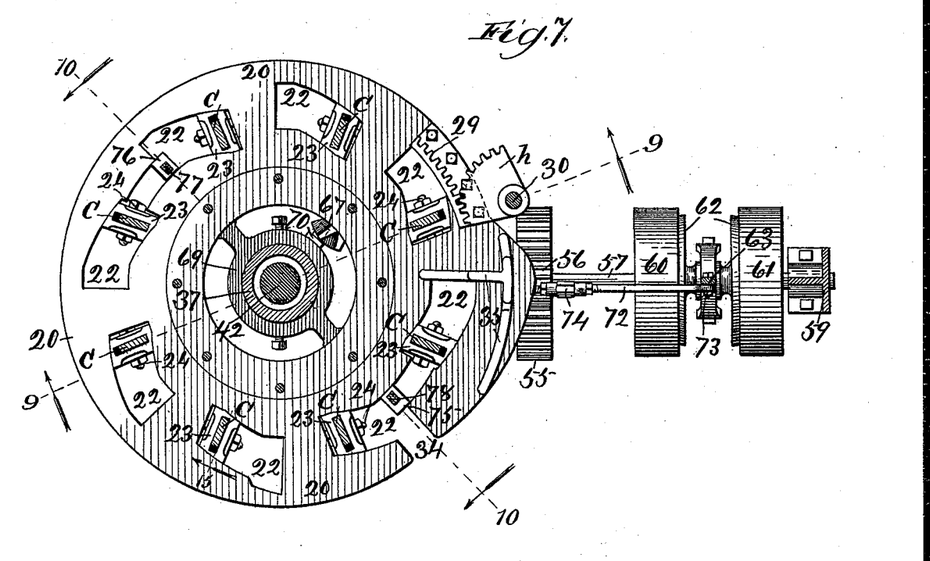
Fig. 7, a horizontal section on line 7, Fig. 1.
Figure 8:
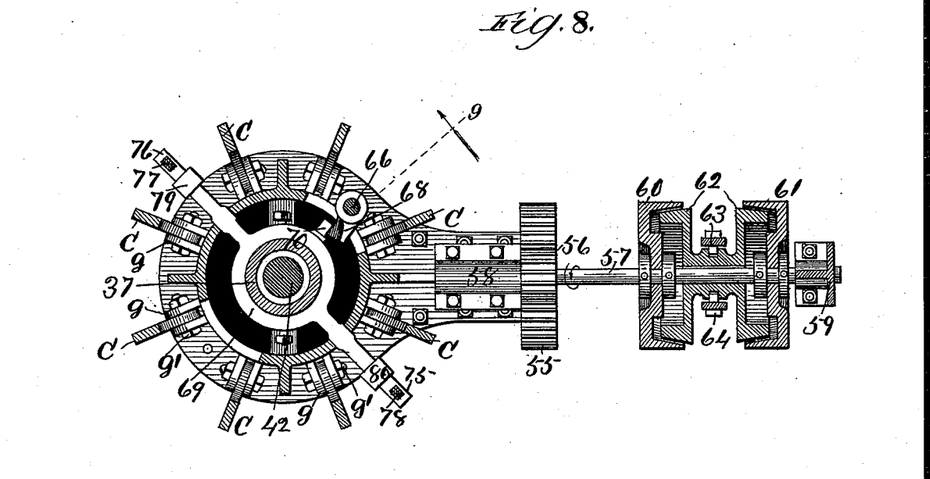
Fig. 8, a horizontal section on line 8, Fig. 1.

The mechanism employed in imparting the required movement to the pull-arms will next be described. This comprises a number of parts; the principal element being a cam-plate 20, Figs. 1, 7, 9 and 10. The inner edge of this cam-plate is fitted into an annular recess 21 formed in the frame near its longitudinal center, which supports the plate in place and permits a reciprocating rotary movement thereof. This cam-plate is provided at intervals with a number of slotted eccentric openings 22 (Fig. 7), corresponding to the number of pull-bars. These openings follow an oblique line with reference to the axial motion of the plate. The pull-bars pass through these openings, and at this point are inclosed in the rocking-arms 23, Figs. 1, 7, 9, 15 and 16. These arms are secured to the pull-bars by a pivot-bolt 24 inserted through the lower bifurcated ends. The opening through these arms is somewhat wider than the bars in order to provide the space 25 (Fig. 15), at the back edge thereof for the purpose of allowing room for play and self-adjustment, when the bars come in contact with the work, so that the work is self-centering and the bars adjust themselves according to the diameter at the point of contact and any irregularity that may exist from a true circle. The front edge of the bars is held normally in contact against the adjacent surface of the rocking-arms by means of a spring 26, located in the spring-case 27, forming a part of said arms. The tension and pressure of the spring is regulated by means of screw-bolt 28. The eccentric edges of the slotted openings in the cam-plate bear against opposite sides of the rocking-arms 23, and when said plate is rotated or shifted in one direction the pull-bars are moved inwardly to the engaged or working position shown in Fig. 2, and when rotated in the opposite direction the bars are thrown out to the disengaged or normal position illustrated in Fig. 3. The cam-plate is rotated by means of a segment-gear, one member, 29, of which is rigidly secured to the plate, (Fig. 7), and the companion member $h$, rigidly mounted on the lower end of the vertical hand-shaft 30, extending up to within convenient reach of the operator and having the hand-lever 31 (Figs. 1, 2, 3, and 9) mounted on the upper end thereof. The lower end of this hand-shaft is journaled in the bracket-arm 32, and the upper part supported and stiffened against springing by a bearing-sleeve 33. One of the slotted eccentric openings in the cam-plate continues out through the edge, as at 34 (Fig. 7) to permit one of the pull-bars to move clear out to the position shown in Fig. 3 for the purpose, as before stated, of providing room or space for putting in and taking out the work. This particular bar must be returned, each time to its place in the cam-plate, by hand, but drops out to its open position automatically when the cam-plate is rotated to bring it opposite the cut-out opening. A reinforce, in the form of a T-shaped rib 35 (Figs. 1 and 7) is cast on that side of the cam-plate next the shifting-mechanism for the purpose of strengthening the plate on that side.

The upper section of the frame-support is provided interiorly and centrally with a sleeve 36, forming an inclosing bearing-guide for the hollow tubular plunger-shaft 37, which is adapted to have a vertical endwise movement by means to be hereinafter described. The upper end of this plunger-shaft is provided with a table or platform 38 on which the work is placed. A barrel 39 is shown in position to be operated upon in Figs. 1, 2, 3 and 9.

Figure 11:
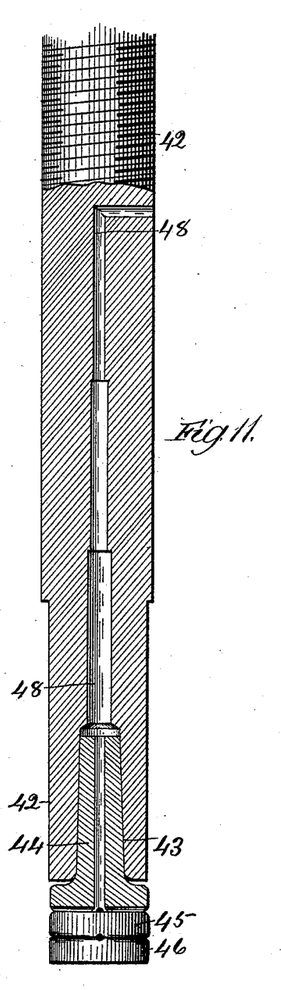
Fig. 11, a broken-away section of the screw driving-shaft, on line 11, Fig. 9.

A screw-threaded bearing-nut 40 (Fig. 9), is inserted up inside of the plunger-shaft; the annular thrust-shoulder 41 providing a stop-bearing therefor. A screw driving-shaft 42 extends up inside of the plunger-shaft and has a screw-threaded engagement with nut 40. The lower end of the frame terminates in the contracted cylindrical part $h'$, forming a journal-bearing-box for the lower unthreaded part of shaft 42. This shaft is provided in the lower end with a recess 43, in which is seated the bearing-toe 44 (Fig. 11) having a flanged base resting on a loose bearing-disk or button 45, which in turn rests on a second disk 46, Figs. 10 and 11. The second or bottom bearing-disk rests on the face of the screw-plug 47, inserted from the lower end of journal-box $h'$. This lower end might be closed solidly, but for convenience in taking out the old and inserting a new journal brass or bushing for the screw-shaft; the screw-plug 47 making this an easy matter. The bearing-disks are grooved and perforated (Fig. 12) so that the lubricant may be distributed to all the bearing-surfaces alike, as the weight and thrust, which is great, centers at this point, and a perfect and continuous lubrication must be assured. The lubricant is injected into the screw-shaft through the side and flows along oil-passage 48 to the different surfaces, thus insuring a perfect lubrication of the step-bearing. The overflow of oil may be drawn out of chamber 49 through valve 50 (Fig. 10), as this chamber will gradually fill up, and it may be necessary to draw it off and keep it down to a certain level to guard against its being thrown out through openings in the frame.

Figure 13:
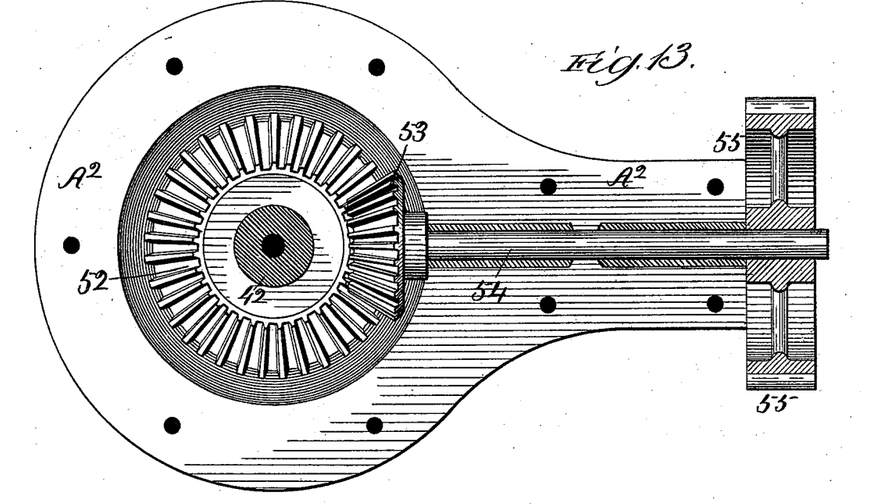
Fig. 13, a horizontal section on line 13, Fig. 1.
Figures 14, 16:
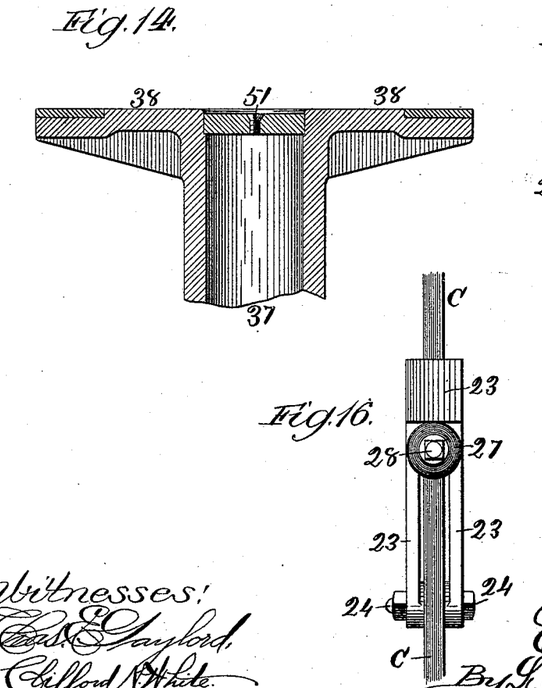
Fig. 14, a broken-away section on line 14, Fig. 9.
Fig. 16, a broken-away detail of construction.
Figure 15:
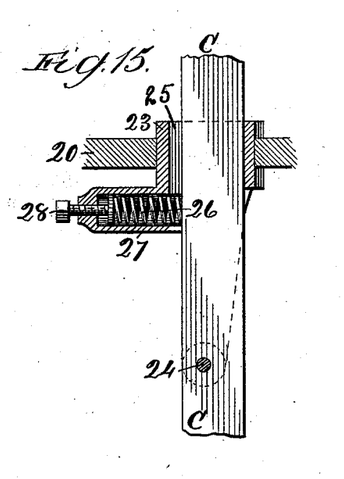
Fig. 15, a broken-away sectional detail, on line 15, Fig. 7.

The upper part of the screw-shaft is lubricated down through the plunger-shaft by taking out the screw 51, inserted in the upper end thereof to close the oil-aperature, as shown in Fig. 14. A bevel gear-wheel 52 (Figs. 10 and 13), is mounted on the lower part of the screw-shaft. A pinion 53 is mounted on the inner end of horizontal counter-shaft 54 and engages with gear-wheel 52. Shaft 54 is provided with suitable journal-bearings in the lower part of the frame, as shown in Fig. 13. A gear-wheel 55 (Figs. 1, 7, 8, 13 and 18) is mounted on the outer end of shaft 54. A pinion 56 is mounted on pulley-shaft 57 and engages with gear-wheel 55. One end of pulley-shaft 57 is provided with a bearing 58 in the machine frame and the opposite end with a bearing in hanger 59.

The ordinary friction clutch mechanism is mounted on the pulley-shaft and consists of band-pulleys 60 and 61, belted from the motive power so as to rotate in opposite directions, and the double cone friction-clutch 62, feathered on the shaft between the band or driving-pulleys and adapted to have contact with either of them, as may be required.

Figure 1:
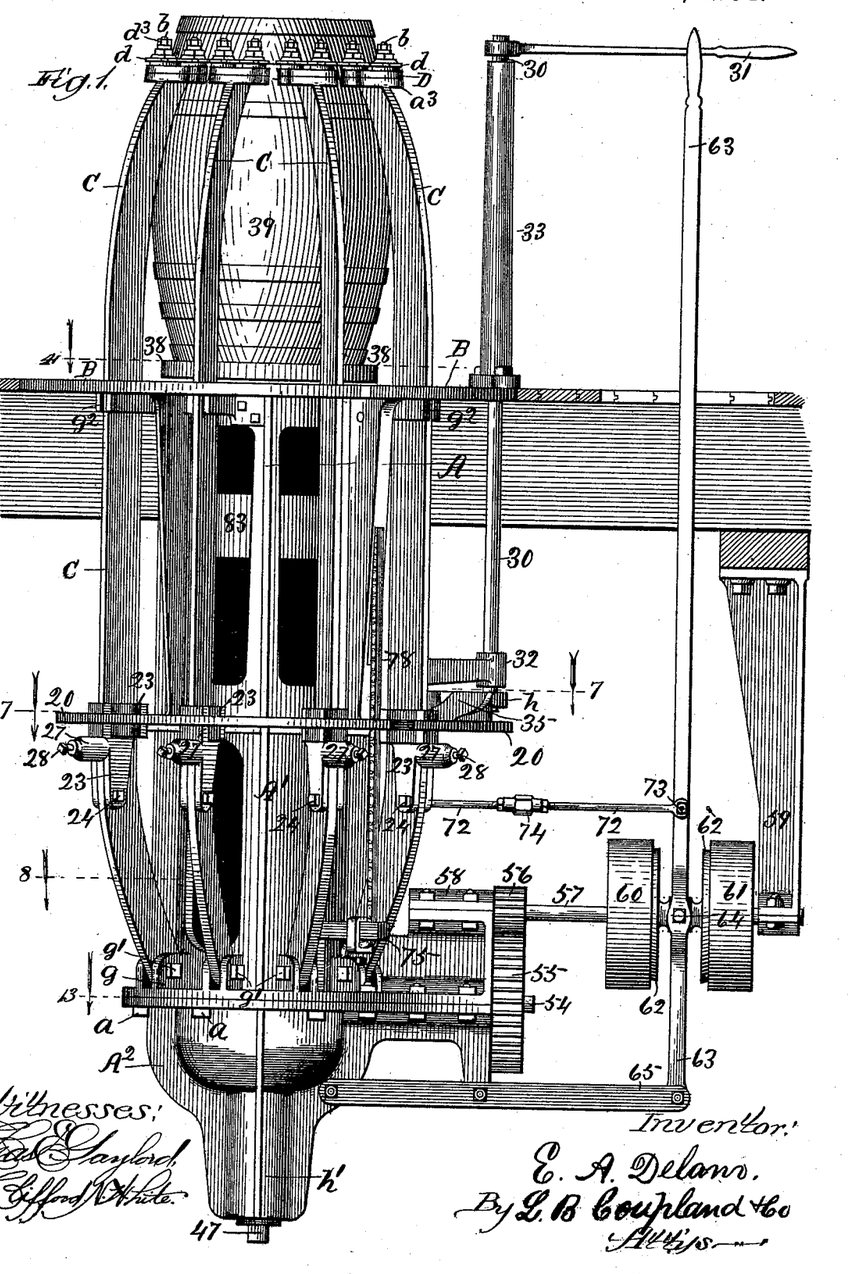
Figure 1 is an elevation of a machine, embodying my improved features, in a working position; the supporting floor structure is shown broken away.

The lower part of hand shifting-lever 63 is made double to straddle the hub of the cone friction-clutch (Fig. 8) and is secured thereto by bolts 64. The extreme lower end of this lever is pivoted to the outer end of bar 65, bolted to the frame; the upper end extending up within reach of the operator, as shown in Fig. 1. By this means the required rotary motion is transmitted to the screw-shaft, which in turn imparts an endwise movement to the plunger-shaft carrying the table or platform on which the work is supported during the operation of setting the hoops. There is also mechanism for automatically shifting the cone friction-clutch into its normal out-of-contact position with reference to the driving-pulleys, in bringing the machine to a state of rest. This comprises the following features: A rotatable spindle 66 (Figs. 9 and 18) is provided with suitable bearings in the frame and has the cam-pieces 67 and 68 mounted thereon near the repective ends thereof. A collar 69 is secured on the lower end of the plunger-shaft, as shown in Figs. 7, 8, 9, 10 and 18. A projecting tripping-pin 70 is seated in this collar and is adapted to have frictional contact with the beveled surfaces of said cam-pieces on the up and down movement of the plunger-shaft and rock said spindle. A lever-arm 71 is mounted on this spindle between the cams. To the terminal end of this lever is attached one end of connecting-rod 72; the opposite end of said rod being attached to hand-lever 63, as at 73, Figs. 1 and 18. By means of right and left threaded nut 74, rod 72 may be shortened or lengthened in maintaining the proper adjustment to shift the cone friction-clutch to a central disengaged position. Thus, the upward movement of the plunger-shaft is arrested by the tripping-pin 70 coming in contact with the upper cam 67 on rocking-spindle 66 and throwing the driving-clutch pulleys out of engagement. The down movement is arrested in the same manner by the tripping-pin having frictional contact with lower cam 68. This automatic stop-mechanism is to prevent accidents to the machine.

In practical working, the up movement is less than the distance between the two cams; the operation being controlled by hand-lever 63. Should the operator, however, move the lever too far, or not far enough, the machine would continue to move slowly, and the attention of the operator being taken up with other duties an accident might happen and the machinery be injured were it not prevented by the automatic stop-mechanism described. When the hand shifting-lever is in a true vertical position then the clutch driving-mechanism is disengaged.

Usually in working, when the hoops on one end are set, the operator will throw the hand shifting-lever 63 over far enough to reverse the motion so that the plunger-shaft will run down, while the barrel is being turned or removed and another put in, and be stopped by the automatic arrangement described and is then in position for the up movement when the work is ready.

The collar 69, on lower end of plunger-shaft, is provided with two horizontal projecting arms 75 and 76. The lower ends of chains 77 and 78 (Fig. 10) are secured to the respective outer ends of said arms by clamps 79 and 80. These chains run up over sheaves 81 and 82 and down to, and are connected to, the annular counterbalance weight 83 at opposite sides. This weight is located in the chamber of the top section of the frame and has a central opening, and loosely incloses the bearing-sleeve of the plunger-shaft. When the plunger-shaft moves upwardly the counterweight descends, and on the down movement the weight goes up. The purpose of this weight is to partially relieve the heavy pressure and lessen the frictional wear on the screw-shaft.

In operation, the barrel is seated loosely on the work-table or platform of the plunger-shaft, and as the pull-bars move inwardly the barrel is automatically brought to a central position by the contact of the hooping heads, thus rendering the operation self centering. With this machine but one hoop is set at a time, commencing with the bilge hoop and continuing in regular order. When one end of the barrel is finished, it is turned end for end and the work completed.

Having thus described my invention, what I claim as new, and desire to secure by Letters Patent, is—

1. In a barrel hooping machine, the combination with the pull bars pivoted at one end and free at the other, and a cam plate provided with eccentric openings, of rocking arms moving in the openings in said cam plate and pivoted to the pull bars, the latter passing loosely through openings in said rocking arms, and springs carried by said rocking arms for normally forcing the pull bars against the inner faces of the openings in said rocking arms, substantially as set forth.

2. In a barrel hooping machine, the combination with the pull bars pivoted at one end and free at the other, and a cam plate provided with eccentric openings, of rocking arms moving in the openings in said cam plate and pivoted to the pull bars, the latter passing loosely through openings in said rocking arms, spring cases on said rocking arms, springs therein for forcing the pull bars against the inner faces of the openings in the rocking arms, and set screws in said cases for regulating the tension of the springs, substantially as set forth.

3. In a barrel hooping machine, the combination with the pull bars, and a cam plate provided with eccentric openings, of rocking arms moving in said openings and having apertures through which the pull bars loosely pass, depending bifurcated arms attached to the rocking arms and to which the pull bars are pivoted at a point below the rocking arms proper, and springs for normally forcing the pull bars into their innermost position with respect to the rocking arms, substantially as set forth.

4. In a barrel hooping machine, the combination with the frame, of the rotatable or rocking spindle journaled therein, the shifting cams mounted thereon, the vertically movable plunger shaft adapted to carry the barrel to be hooped, the collar mounted on the lower end thereof, the tripping pin projecting from said collar and adapted to have frictional contact with said cams, the lever arm mounted on said spindle, the driving pulleys for imparting the vertical motion to the plunger shaft through suitable intermediate mechanism, the hand shifting lever, and the rod connecting said hand lever and the lever arm on the rocking spindle, substantially as set forth.

5. In a barrel-hooping machine the combination with, a plunger-shaft, a collar, provided with projecting arms and mounted on the lower end of the plunger-shaft, an annular counterbalance weight, the chains, connecting said arms and weight, the sheaves over which said chains run, and the screw driving-shaft, substantially as set forth.

EBEN A. DELANO.

Witnesses:
L. M. FREEMAN,
L. B. COUPLAND.